United States Patent
Lim et al.

(10) Patent No.: US 9,413,582 B2
(45) Date of Patent: Aug. 9, 2016

(54) METHOD AND APPARATUS FOR TRANSMITTING AND RECEIVING

(71) Applicant: Electronics and Telecommunications Research Institute, Daejeon (KR)

(72) Inventors: Hyoungsoo Lim, Daejeon (KR); Hun Hee Lee, Daejeon (KR); Joungil Yun, Daejeon (KR); Kyu Tae Yang, Daejeon (KR); Young Su Kim, Daejeon (KR); Yun Jeong Song, Daejeon (KR); Namho Hur, Sejong-si (KR)

(73) Assignee: Electronics and Telecommunications Research Instit, Daejeon (KR)

( * ) Notice: Subject to any disclaimer, the term of this patent is extended or adjusted under 35 U.S.C. 154(b) by 0 days.

(21) Appl. No.: 14/643,023

(22) Filed: Mar. 10, 2015

(65) Prior Publication Data

US 2015/0280957 A1    Oct. 1, 2015

(30) Foreign Application Priority Data

Mar. 25, 2014    (KR) .................. 10-2014-0034953

(51) Int. Cl.
| | |
|---|---|
| H04L 27/34 | (2006.01) |
| H04L 27/36 | (2006.01) |
| H04L 27/38 | (2006.01) |
| H04W 12/04 | (2009.01) |
| H04W 12/02 | (2009.01) |

(52) U.S. Cl.
CPC .............. *H04L 27/36* (2013.01); *H04L 27/38* (2013.01); *H04W 12/04* (2013.01); *H04W 12/02* (2013.01)

(58) Field of Classification Search
CPC .......... H04K 1/00; H04L 1/0045; H04L 9/12; H04L 2463/062; H04L 9/0838; H04L 2463/041; H04L 27/34; H04W 12/06; H04W 56/001

USPC .................. 375/219–222, 295, 298, 316, 324
See application file for complete search history.

(56) References Cited

U.S. PATENT DOCUMENTS

| | | | | |
|---|---|---|---|---|
| 5,305,348 A * | 4/1994 | Izumi | ...................... | H04J 13/16 375/141 |
| 5,412,730 A * | 5/1995 | Jones | ........................ | H04L 9/12 380/262 |
| 5,864,625 A * | 1/1999 | Rutledge | ............... | H04L 9/0891 380/256 |
| 5,978,483 A * | 11/1999 | Thompson, Jr. | .......... | H04L 9/12 340/5.26 |
| 6,047,019 A * | 4/2000 | Ishii | ........................ | H04B 7/082 343/703 |
| 6,101,428 A * | 8/2000 | Snyder | ................... | B60R 25/245 340/425.5 |
| 6,307,940 B1 * | 10/2001 | Yamamoto | ............ | H04L 9/0662 380/277 |
| 6,839,447 B2 * | 1/2005 | Nielsen | ................. | H04R 25/554 381/312 |
| 6,853,675 B1 * | 2/2005 | Oleynik | ................ | H04W 52/58 370/342 |
| 6,882,680 B1 * | 4/2005 | Oleynik | ................ | H04B 1/707 375/141 |
| 7,020,183 B2 * | 3/2006 | Nakamura | ............. | H04B 1/707 370/335 |

(Continued)

FOREIGN PATENT DOCUMENTS

JP           2011-244077 A      12/2011

*Primary Examiner* — Emmanuel Bayard
(74) *Attorney, Agent, or Firm* — William Park & Associates Ltd.

(57) ABSTRACT

A transmitting apparatus generates a modulation pattern code corresponding to an input security key and modulates and transmits the bit stream with a corresponding modulation method for a duration of a corresponding modulation method while changing a modulation method according to the generated modulation pattern code.

14 Claims, 6 Drawing Sheets

(56) References Cited

U.S. PATENT DOCUMENTS

| | | | | |
|---|---|---|---|---|
| 7,200,233 | B1* | 4/2007 | Keller | H04L 9/0656 380/268 |
| 7,471,790 | B2* | 12/2008 | Yoshida | H04L 9/0852 380/28 |
| 7,801,300 | B2* | 9/2010 | Fuse | H04K 1/02 380/28 |
| 7,822,204 | B2* | 10/2010 | Yoshida | H04L 1/0045 380/255 |
| 8,229,490 | B2* | 7/2012 | Hayashi | H04W 52/40 455/436 |
| 8,284,937 | B2* | 10/2012 | Akutsu | H04L 9/12 375/149 |
| RE45,368 | E* | 2/2015 | Orihashi | 375/150 |
| 9,114,721 | B2* | 8/2015 | Tsuda | B60L 8/003 |
| 2005/0157875 | A1* | 7/2005 | Nishioka | H04L 9/0858 380/46 |
| 2005/0162338 | A1* | 7/2005 | Ikeda | G09G 5/006 345/2.1 |
| 2008/0019523 | A1* | 1/2008 | Fuse | H04L 9/088 380/256 |
| 2008/0049597 | A1 | 2/2008 | Walker et al. | |
| 2008/0304833 | A1* | 12/2008 | Zheng | H04B 10/1143 398/135 |
| 2009/0270037 | A1* | 10/2009 | Ikeda | G09G 5/006 455/41.3 |
| 2010/0215078 | A1* | 8/2010 | Rice | H04B 1/707 375/141 |
| 2010/0233967 | A1 | 9/2010 | Kim et al. | |
| 2012/0319899 | A1* | 12/2012 | Tangudu | 342/357.69 |
| 2014/0072119 | A1* | 3/2014 | Hranilovic | H04L 9/3215 380/270 |
| 2014/0078506 | A1* | 3/2014 | Hu | G01M 11/3118 356/445 |
| 2015/0365129 | A1* | 12/2015 | Murakami | H04B 1/707 375/142 |

* cited by examiner

METHOD AND APPARATUS FOR TRANSMITTING AND RECEIVING

CROSS-REFERENCE TO RELATED APPLICATION

This application claims priority to and the benefit of Korean Patent Application No. 10-2014-0034953 filed in the Korean Intellectual Property Office on Mar. 25, 2014, the entire contents of which are incorporated herein by reference.

BACKGROUND OF THE INVENTION (a) Field of the Invention

The present invention relates to a method and apparatus for transmitting and receiving. More particularly, the present invention relates to a method and apparatus for transmitting and receiving that can improve security in a physical layer.

(b) Description of the Related Art

Amplitude and phase information of a transmitting signal are changed and transmitted according to a characteristic of a channel of a transmitting medium. Such a process is referred to as modulation. In general, a modulation method in digital broadcasting and communication uses a BPSK, which is binary modulation, and QPSK and M-QAM, which are multilevel modulations.

In an existing transmitting system, a modulation method is determined according to a characteristic of a transmitting medium. In order to enlarge transmitting coverage, the transmitting system selects a modulation method that has slow data transmission rate but a signal-to-noise ratio (SNR) that is required at the receiving side is low and, in order to transmit much data with small transmitting coverage, the transmitting system selects a modulation method in which an SNR required at the receiving side is high, but that can transmit much data. A modulation method that is selected in this way is not changed from a start time point to a final time point of transmission of a transmitting signal.

In this way, when one modulation method is used, security of a signal may be weak in a physical layer from a security viewpoint.

SUMMARY OF THE INVENTION

The present invention has been made in an effort to provide a method and apparatus for transmitting and receiving having advantages of being capable of reinforcing security of a signal in a physical layer.

An exemplary embodiment of the present invention provides a transmitting apparatus that transmits a bit stream. The transmitting apparatus includes a modulation controller, a modulator, and a transmitter. The modulation controller generates a modulation pattern code according to an input security key. The modulator modulates the bit stream that is input while changing a modulation method according to the modulation pattern code. The transmitter transmits a modulated signal.

The modulation pattern code may include modulation pattern information representing a modulation method.

The modulation pattern code may further include a duration of a modulation method in which modulation pattern information is represented.

The modulator may modulate a portion of the bit stream for a duration of a first modulation method with the first modulation method according to the modulation pattern information, and modulate another portion of the bit stream for a duration of a second modulation method with the second modulation method according to the modulation pattern information.

Another embodiment of the present invention provides a receiving apparatus that receives a signal. The receiving apparatus includes a receiver, a demodulation controller, and a demodulator. The receiver receives a signal that is transmitted by modulating an input stream while changing a modulation method according to a modulation pattern code that is generated to correspond to a security key from a transmitting apparatus. The demodulation controller generates a modulation pattern code corresponding to the security key. The demodulator demodulates the received signal with a demodulation method corresponding to a modulation method that is changed according to a modulation pattern code that is generated by the demodulation controller.

The modulation pattern code may include modulation pattern information representing a modulation method.

The modulation pattern code may further include a duration of a modulation method in which modulation pattern information is represented. The demodulation controller may determine a modulation method that is applied to the transmitted signal and a duration of the modulation method that is applied to the transmitted signal from the modulation pattern information, and transfer the demodulation method and the duration corresponding to the modulation method that is applied to the transmitted signal to the demodulator.

The receiving apparatus may further include an equalizer that equalizes the received signal and that transfers the equalized signal to the demodulator.

Yet another embodiment of the present invention provides a method in which a transmitting apparatus transmits a bit stream. The method may include: generating a modulation pattern code corresponding to an input security key; modulating the bit stream with a corresponding modulation method for a duration of the corresponding modulation method while changing a modulation method according to the modulation pattern code; and transmitting a modulated signal.

The modulation pattern code may include modulation pattern information representing a modulation method or the modulation pattern information and duration of a corresponding modulation method.

The modulating of the bit stream may include: determining a modulation method according to the modulation pattern information; modulating at least a partial bit of the bit stream with the determined modulation method for the duration of the determined modulation method; and changing the modulation method according to the modulation pattern information after the duration of the determined modulation method.

Yet another embodiment of the present invention provides a method in which a receiving apparatus receives a signal. The method includes: receiving a signal that is transmitted by modulating an input stream while changing a modulation method according to a modulation pattern code corresponding to a security key in a transmitting apparatus; generating a modulation pattern code corresponding to an input security key; and demodulating a signal that is received with a demodulation method corresponding to a modulation method that is determined according to the generated modulation pattern code.

The modulation pattern code may include modulation pattern information representing each modulation method. The demodulating of a signal may include: determining a modulation method that is applied to the transmitted signal from the generated modulation pattern code; and demodulating a signal that is received for a predetermined duration with a demodulation method corresponding to a modulation method that is applied to the transmitted signal.

The modulation pattern code may further include a duration of a corresponding modulation method, and the predetermined duration may correspond to a duration of a modulation method that is applied to the transmitted signal.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification and claims, unless explicitly described to the contrary, the word "comprise" and variations such as "comprises" or "comprising" will be understood to imply the inclusion of stated elements but not the exclusion of any other elements.

Hereinafter, a method and apparatus for transmitting and receiving according to an exemplary embodiment of the present invention will be described in detail with reference to the drawings.

Figure 1:
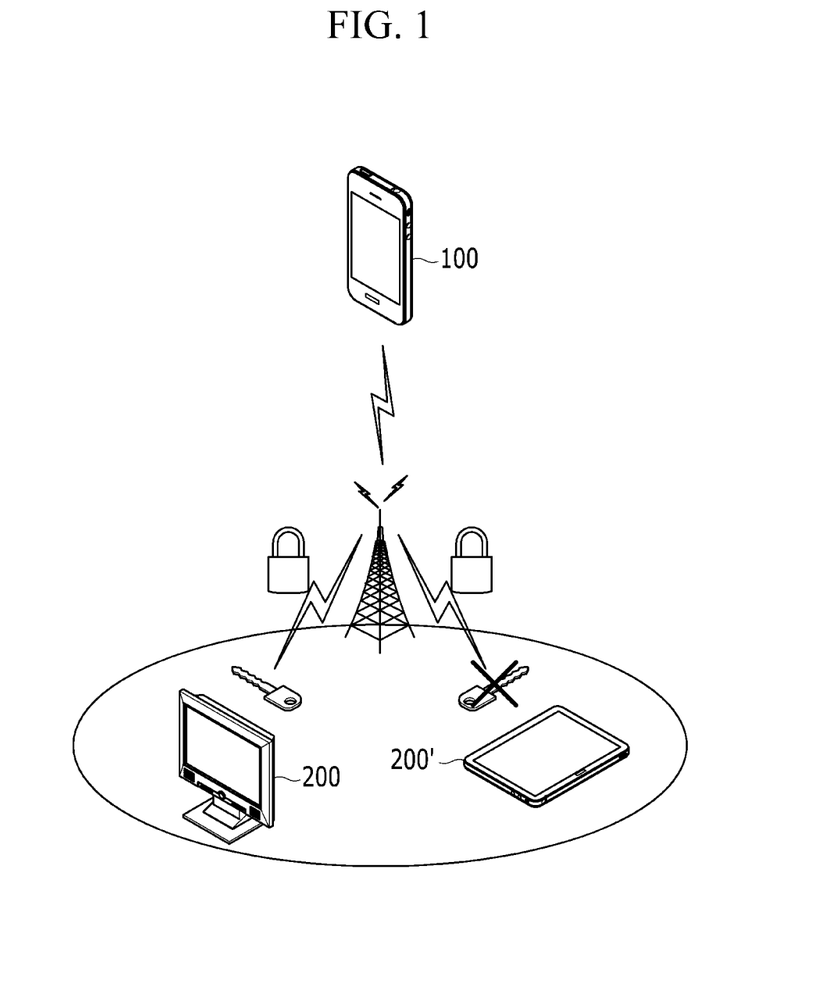
FIG. 1 is a diagram illustrating a transmitting and receiving apparatus according to an exemplary embodiment of the present invention.

FIG. 1 is a diagram illustrating a transmitting and receiving apparatus according to an exemplary embodiment of the present invention.

Referring to FIG. 1, a transmitting apparatus 100 modulates and transmits a bit stream while changing a modulation method according to a predetermined modulation pattern code instead of modulating the bit stream with a modulation method of one method.

A signal that is modulated by the transmitting apparatus 100 may be transmitted to at least one of receiving apparatuses 200 and 200' through, for example, a base station.

When the receiving apparatuses 200 and 200' receive a signal that is modulated according to a modulation pattern code, the receiving apparatuses 200 and 200' demodulate the received signal using the modulation pattern code. In this case, the receiving apparatus 200 having the modulation pattern code may demodulate the signal, but the receiving apparatus 200' that does not have the modulation pattern code may not demodulate the signal.

Figure 2:
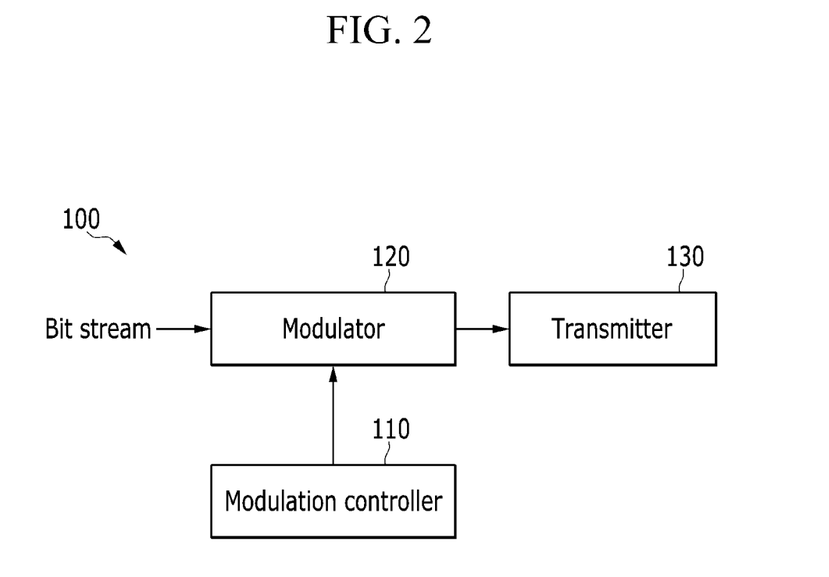
FIG. 2 is a diagram illustrating the transmitting apparatus of FIG. 1.
Figure 3:
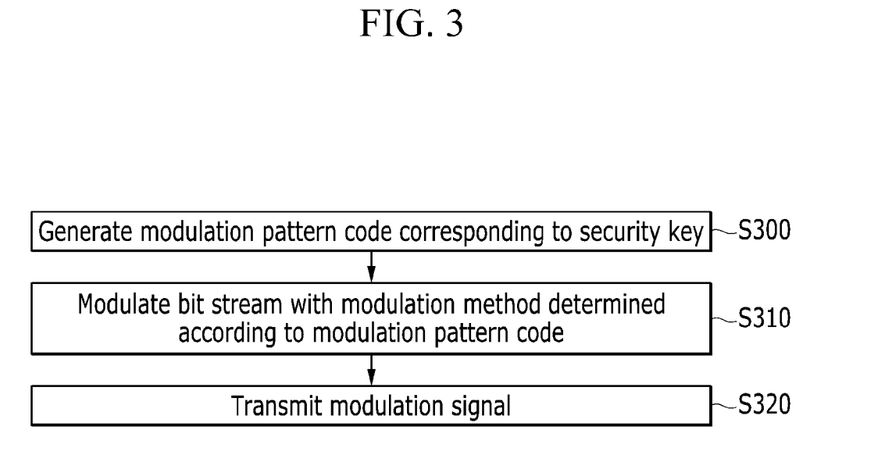
FIG. 3 is a flowchart illustrating a transmitting method of the transmitting apparatus of FIG. 2.

FIG. 2 is a diagram illustrating the transmitting apparatus of FIG. 1, and FIG. 3 is a flowchart illustrating a transmitting method of the transmitting apparatus of FIG. 2.

Referring to FIG. 2, the transmitting apparatus 100 includes a modulation controller 110, a modulator 120, and a transmitter 130.

Referring to FIG. 3, the modulator 120 modulates a bit stream that is input for security transmission of a signal according to a modulation pattern code to generate a modulation signal.

The modulation controller 110 generates a modulation pattern code corresponding to an input security key (S300), and determines a modulation method of the modulator 120 according to the generated modulation pattern code. The modulation pattern code includes modulation pattern information. The modulation pattern information represents a modulation method. Therefore, a modulation method may be determined according to the modulation pattern information. The modulation pattern code may further include a duration of a modulation method in which modulation pattern information is represented. A corresponding modulation method is continued according to a duration of a modulation method. When the modulation pattern code includes only modulation pattern information, a duration of each modulation method in which the modulation pattern information is represented may be randomly set.

The modulation controller 110 determines a modulation method according to modulation pattern information and transfers the determined modulation method and a duration of the modulation method to the modulator 120. As the modulation method, both an analog modulation method and a digital modulation method may be used.

The modulator 120 modulates each bit of a bit stream that is input according to a modulation method that is determined according to a modulation pattern code of the modulation controller 110 and a duration of a corresponding modulation method to generate a modulation signal (S310).

The transmitter 130 transmits a modulation signal to a receiving apparatus (S320).

In this way, bit stream that is input to the transmitting apparatus 100 is modulated and transmitted with different modulation methods at every determined time according to a predetermined modulation pattern code.

Figure 4:
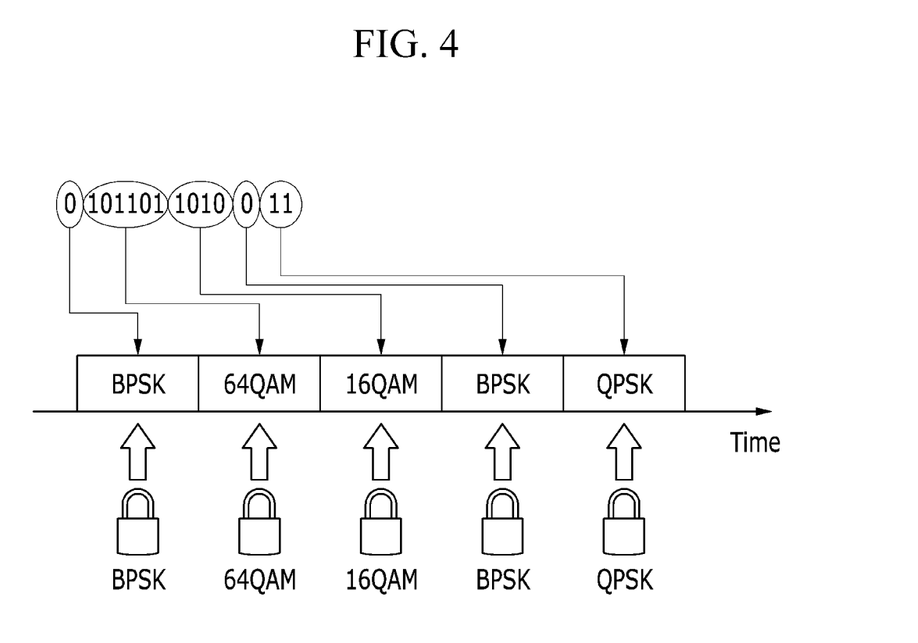
FIG. 4 is a diagram illustrating an example of a modulation method according to an exemplary embodiment of the present invention.

FIG. 4 is a diagram illustrating an example of a modulation method according to an exemplary embodiment of the present invention.

Referring to FIG. 4, when it is set that modulation pattern information of a modulation pattern code sequentially designates a modulation method of BPSK, 64QAM, 16QAM, BPSK, and QPSK and when a duration of each modulation method is set to 1 symbol, the modulator 120 may sequentially modulate an input stream of 01011011010011 with a modulation method of BPSK, 64QAM, 16QAM, BPSK, and QPSK according to modulation pattern information. That is, 1 bit of first input "0" is modulated to one symbol by a BPSK modulation method, and 6 bits of "101101" that are input next are modulated to one symbol by 64QAM. 4 bits of "1010" that are input next are modulated to one symbol by a 16QAM modulation method, 1 bit of "0" that is input next is modulated to one symbol by a BPSK modulation method, and 2 bits of "11" that are input next are modulated to one symbol by a QPSK modulation method. In this way, sequentially modulated symbols are transmitted to the receiving apparatus.

Figure 5:
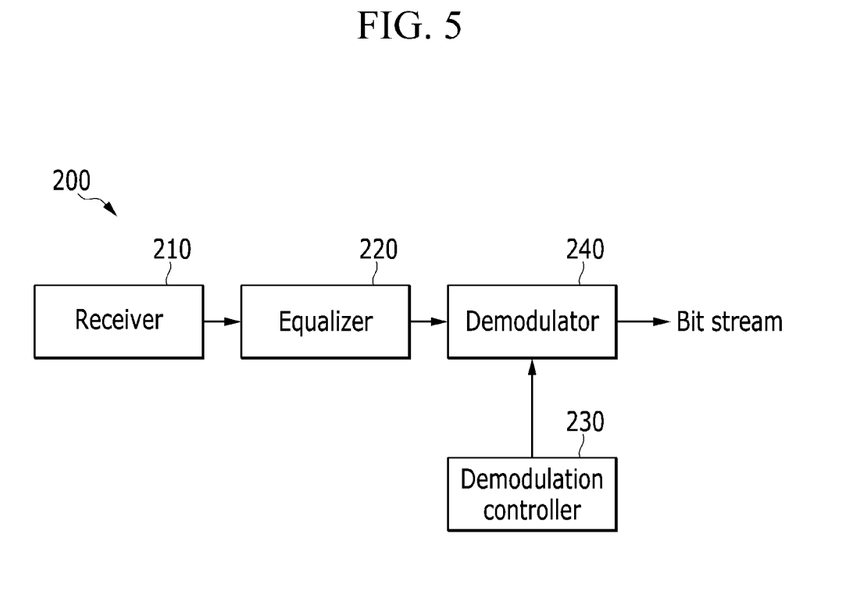
FIG. 5 is a diagram illustrating the receiving apparatus of FIG. 1.
Figure 6:
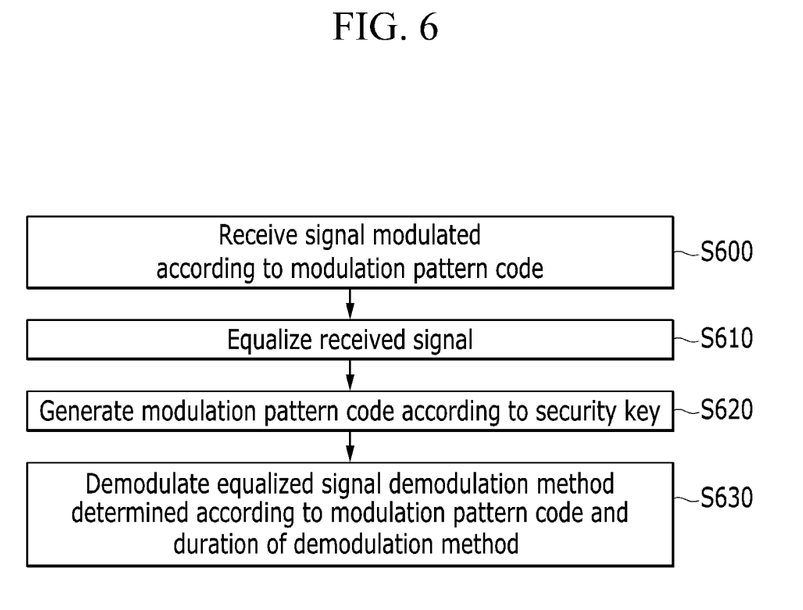
FIG. 6 is a flowchart illustrating a receiving method of the receiving apparatus of FIG. 5.

FIG. 5 is a diagram illustrating the receiving apparatus of FIG. 1, and FIG. 6 is a flowchart illustrating a receiving method of the receiving apparatus of FIG. 5.

Referring to FIG. 5, a receiving apparatus 200 includes a receiver 210, an equalizer 220, a demodulation controller 230, and a demodulator 240.

Referring to FIG. 6, the receiver 210 receives a signal that is modulated by the transmitting apparatus 100 according to a modulation pattern code (S600).

The equalizer 220 equalizes the received signal and transfers the equalized signal to the demodulator (S610).

The demodulation controller 230 generates a modulation pattern code corresponding to an input security key (S620), and determines a demodulation method of the demodulator 240 according to the generated modulation pattern code. In this case, a security key that is input to the demodulation controller 230 may be the same as a security key that is input to the modulation controller 110.

The demodulation controller 230 determines a demodulation method according to modulation pattern information, and transfers the demodulation method and a duration of the modulation method to the demodulator 240. The demodulation method that is determined according to modulation pattern information represents a demodulation method corresponding to a modulation method that is determined according to modulation pattern information. That is, the demodulation controller 230 may determine a modulation method that is applied to a received signal and a duration of the modulation method according to modulation pattern information of a modulation pattern code that is generated by the demodulation controller 230, and transfer a demodulation method and a duration corresponding to a modulation method that is applied to a received signal to the demodulator 240.

The demodulator 240 demodulates an equalized signal according to a demodulation method that is determined according to a modulation pattern code and a duration of the demodulation method (S630). For example, as shown in FIG. 4, when the transmitting apparatus 100 modulates and transmits an input stream, if the receiving apparatus 200 knows a security key, the receiving apparatus 200 may know a modulation method that is applied to a presently received signal and a duration of the modulation method through a modulation pattern code corresponding to a security key. Therefore, the receiving apparatus 200 demodulates a signal that is received for a corresponding duration with a demodulation method corresponding to the modulation method.

When the receiving apparatus 200 does not know a security key, the receiving apparatus 200 does not know whether a present signal is a modulated signal and thus cannot demodulate the present signal with a transmitting signal.

By additionally applying such a modulation method to existing transmission technology having security such as DS-SS, FH-SS, and TH-SS, the modulation method may be used for further reinforcing security of existing transmission technology.

At least a partial function of the foregoing method and apparatus for transmitting and receiving according to an exemplary embodiment of the present invention may be implemented with hardware or may be implemented with software that is combined with hardware. For example, a processor that is implemented with a central processing unit (CPU), other chipsets, or a microprocessor may perform a function of the modulation controller 110 and the modulator 120 of the transmitting apparatus 100 or the equalizer 220, the demodulation controller 230, and the demodulator 240 of the receiving apparatus 200, and a transceiver may perform a function of the transmitter 130 of the transmitting apparatus 100 or the receiver 210 of the receiving apparatus 200.

The modulation controller 110 may generate a modulation pattern code and transfer the modulation pattern code to the modulator 120. In this case, the modulator 120 may perform modulation according to a modulation method in which a modulation pattern code is represented and a duration of the modulation method.

According to an exemplary embodiment of the present invention, the transmitting side modulates and transmits a transmitting signal while changing a modulation method according to a predetermined modulation method pattern in a physical layer. Therefore, only when the receiving side knows such a modulation method pattern may the receiving side normally demodulate a signal and thus security of a physical layer can be reinforced.

An exemplary embodiment of the present invention may not only be embodied through the above-described apparatus and/or method, but may also be embodied through a program that executes a function corresponding to a configuration of the exemplary embodiment of the present invention or through a recording medium on which the program is recorded, and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A transmitting apparatus that transmits a bit stream, the transmitting apparatus comprising:
    a modulation controller that generates a modulation pattern code according to an input security key;
    a modulator that modulates the bit stream that is input while changing a modulation method according to the modulation pattern code; and
    a transmitter that transmits a modulated signal.

2. The transmitting apparatus of claim 1, wherein the modulation pattern code comprises modulation pattern information representing a modulation method.

3. The transmitting apparatus of claim 2, wherein the modulation pattern code further comprises a duration of a modulation method in which modulation pattern information is represented.

4. The transmitting apparatus of claim 3, wherein the modulator modulates a portion of the bit stream for a duration of a first modulation method with the first modulation method according to the modulation pattern information, and modulates another portion of the bit stream for a duration of a second modulation method with the second modulation method according to the modulation pattern information.

5. A receiving apparatus that receives a signal, the receiving apparatus comprising:
    a receiver that receives a signal that is transmitted by modulating an input stream while changing a modulation method according to a modulation pattern code that is generated to correspond to a security key from a transmitting apparatus;
    a demodulation controller that generates a modulation pattern code corresponding to the security key; and
    a demodulator that demodulates the received signal with a demodulation method corresponding to a modulation method that is changed according to a modulation pattern code that is generated by the demodulation controller.

6. The receiving apparatus of claim 5, wherein the modulation pattern code comprises modulation pattern information representing a modulation method.

7. The receiving apparatus of claim 6, wherein the modulation pattern code further comprises a duration of a modulation method in which modulation pattern information is represented, and the demodulation controller determines a modulation method that is applied to the transmitted signal and a duration of the modulation method that is applied to the transmitted signal from the modulation pattern information, and transfers the demodulation method and the duration corresponding to the modulation method that is applied to the transmitted signal to the demodulator.

8. The receiving apparatus of claim 5, further comprising an equalizer that equalizes the received signal and that transfers the equalized signal to the demodulator.

9. A method in which a transmitting apparatus transmits a bit stream, the method comprising:

generating a modulation pattern code corresponding to an input security key;

modulating the bit stream with a corresponding modulation method for a duration of the corresponding modulation method while changing a modulation method according to the modulation pattern code; and transmitting a modulated signal.

10. The method of claim 9, wherein the modulation pattern code comprises:

modulation pattern information representing the modulation method; or the modulation pattern information and duration of a corresponding modulation method.

11. The method of claim 9, wherein the modulating of the bit stream comprises:

determining a modulation method according to the modulation pattern information;

modulating at least a partial bit of the bit stream with the determined modulation method for the duration of the determined modulation method; and changing the modulation method according to the modulation pattern information after the duration of the determined modulation method.

12. A method in which a receiving apparatus receives a signal, the method comprising:

receiving a signal that is transmitted by modulating an input stream while changing a modulation method according to a modulation pattern code corresponding to a security key in a transmitting apparatus;

generating a modulation pattern code corresponding to an input security key; and demodulating a signal that is received with a demodulation method corresponding to a modulation method that is determined according to the generated modulation pattern code.

13. The method of claim 12, wherein the modulation pattern code comprises modulation pattern information representing a modulation method, and the demodulating of a signal comprises:

determining a modulation method that is applied to the transmitted signal from the generated modulation pattern code; and demodulating a signal that is received for a predetermined duration with a demodulation method corresponding to a modulation method that is applied to the transmitted signal.

14. The method of claim 13, wherein the modulation pattern code further comprises a duration of a corresponding modulation method, and the predetermined duration corresponds to a duration of a modulation method that is applied to the transmitted signal.

* * * * *